US012730994B2

(12) United States Patent
Kapelushnik et al.

(10) Patent No.: US 12,730,994 B2
(45) **Date of Patent: *Sep. 8, 2026**

(54) COUNTER PAD FOR JEWELRY

(71) Applicant: Segoma Ltd., Herzeliya (IL)

(72) Inventors: Gilad Kapelushnik, Herzeliya (IL); Amit Eldar, Herzeliya (IL)

(73) Assignee: Segoma Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/243,053

(22) Filed: Jun. 19, 2025

(65) Prior Publication Data

US 2025/0315634 A1 Oct. 9, 2025

Related U.S. Application Data

(63) Continuation-in-part of application No. 18/426,395, filed on Jan. 30, 2024, now Pat. No. 12,373,665.

(51) Int. Cl.

| | |
|---|---|
| ***G06K 7/10*** | (2006.01) |
| ***A47F 9/04*** | (2006.01) |
| ***A47F 10/00*** | (2006.01) |
| ***A47G 11/00*** | (2006.01) |
| ***G06K 19/077*** | (2006.01) |

(52) U.S. Cl.

CPC .......... *G06K 7/10475* (2013.01); *A47F 9/046* (2013.01); *A47F 10/00* (2013.01); *A47G 11/008* (2013.01); *G06K 19/07773* (2013.01); *A47F 2010/005* (2013.01)

(58) Field of Classification Search

CPC ......... G06K 7/10475; G06K 19/07773; G06K 19/07762; A47F 9/046; A47F 10/00; A47F 11/008; A47F 2010/005

See application file for complete search history.

(56) References Cited

U.S. PATENT DOCUMENTS

| | | | |
|---|---|---|---|
| 10,185,912 B2 | 1/2019 | Murdoch et al. | |
| 12,373,665 B1 * | 7/2025 | Kapelushnik .... | G06K 19/07762 |

FOREIGN PATENT DOCUMENTS

| | | |
|---|---|---|
| JP | 2004-250185 | 9/2004 |

OTHER PUBLICATIONS

Notice of Allowance Dated Mar. 18, 2025 From the U.S. Appl. No. 18/426,395. (7 Pages).

Cai et al. “Antenna for RFID Smart Table”, 2007 IEEE Antennas and Propagation Society International Symposium, Dec. 6, 2007.

* cited by examiner

*Primary Examiner* — Matthew Mikels

(57) ABSTRACT

There is provided a counter pad, comprising: a non-abrasive and flexible surface including: a work surface designed for placement of jewelry, and a data communication interface configured for communicating with at least one screen for presenting the data associated with an identifier of the jewelry, an RFID antenna(s) positioned within the non-abrasive and flexible surface and below the work surface, the RFID antenna(s) configured to transmit and/or receive signals from a RFID tag(s) located on the jewelry when the jewelry is located on the work surface, an RFID reader(s) configured to process the signals to determine the identifier of the jewelry, a wireless network interface(s) configured to communicate with a wireless network, a processor(s) executing a code for accessing a server over the wireless network for obtaining data associated with the identifier, a memory for storing the code and the data, and a battery.

20 Claims, 3 Drawing Sheets

COUNTER PAD FOR JEWELRY

RELATED APPLICATION

This application is a Continuation-in-Part (CIP) of U.S. patent application Ser. No. 18/426,395 filed on Jan. 30, 2024. The contents of the above applications are all incorporated by reference as if fully set forth herein in their entirety.

BACKGROUND

The present invention, in some embodiments thereof, relates to a counter pad and, more specifically, but not exclusively, to a jewelry pad.

A counter pad, in a retail or display context, refers to a padded surface or mat that is placed on a counter or tabletop to serve various purposes. Counter pads are commonly used in retail stores, boutiques, and other commercial settings.

A jewelry pad, also known as a jewelry cushion or pillow, is a small, padded surface designed to hold and display jewelry items. These pads are commonly used in retail settings, jewelry stores, and for personal storage to showcase and protect various types of jewelry, such as rings, earrings, necklaces, bracelets, and watches.

SUMMARY

According to an aspect of the disclosure, a counter pad for presentation of data associated with at least one piece of jewelry, comprising: a non-abrasive and flexible surface including: a work surface designed for placement of the at least one piece of jewelry, and at least one RFID antenna positioned within the non-abrasive and flexible surface and below the work surface, the at least one RFID antenna configured to transmit and/or receive signals from at least one RFID tag located on the at least one piece of jewelry when the at least one piece of jewelry is located on the work surface, a data communication interface configured for communicating with at least one screen for presenting the data associated with an identifier of the at least one piece of jewelry, at least one RFID reader configured to process the signals to determine the identifier of the at least one piece of jewelry, at least one wireless network interface configured to communicate with a wireless network, at least one processor executing a code for accessing a server over the wireless network for obtaining the data associated with the identifier, a memory for storing the code and the data associated with the identifier obtained from the server, and a battery configured for powering the counter pad.

In a further implementation form of the aspect, the at least one screen is physically detached from the counter pad.

In a further implementation form of the aspect, the data communication interface is configured for wireless communication with the at least one screen.

In a further implementation form of the aspect, the data communication interface is configured for wireless communication with a plurality of screens of different types.

In a further implementation form of the aspect, the non-abrasive and flexible surface is selected from: velvet, suede, leather, leatherette, plush fabric, and felt.

In a further implementation form of the aspect, regions of the non-abrasive and flexible surface surrounding the work surface are padded and are higher than the work surface for protecting the at least one piece of jewelry located on the work surface, and for providing a barrier for preventing the at least one piece of jewelry from sliding off the counter pad.

In a further implementation form of the aspect, the at least one RFID antenna and/or the at least one RFID reader are configured for wirelessly powering the at least one RFID tag located on the at least one piece of jewelry implemented as a passive RFID tag.

In a further implementation form of the aspect, the at least one RFID antenna is implemented as short range to transmit and/or receive signals when the at least one piece of jewelry with the at least one RFID tag disposed thereon is located on the work surface and wherein the at least one RFID antenna is unable to transmit and/or receive signals when the at least one piece of jewelry with the at least one RFID tag disposed thereon is not located on the work surface.

In a further implementation form of the aspect, the at least one RFID antenna is configured to transmit and/or receive signals in response to the at least one piece of jewelry with the at least one RFID tag disposed thereon is in contact with the work surface.

In a further implementation form of the aspect, further comprising at least one contact sensor associated with the work surface and configured for sensing when the at least one piece of jewelry is in contact with the work surface, wherein in response to sensing that the at least one piece of jewelry is in contact with the work surface by the contact sensor, triggering the at least one RFID antenna for sensing the signal from the at least one RFID tag and triggering the at least one RFID reader to analyze the signals to obtain the identifier, and triggering the at least one processor to automatically present the data associated with the identifier on the at least one screen.

In a further implementation form of the aspect, in response to sensing that the at least one piece of jewelry is not in contact with the work surface and/or in response to not sensing that the at least one piece of jewelry is in contact, the at least one RFID antenna is blocked from sensing the RFID tag and/or the at least one RFID antenna is non-powered and/or signals received by the at least one RFID antenna are ignored.

In a further implementation form of the aspect, further comprising a second RFID antenna configured for sensing the RFID tag on the at least one piece of jewelry at a range at least as far as from the counter pad to a location where the at least one piece of jewelry is stored, wherein the RFID reader is configured for continuously tracking the RFID tag and the processor is configured for generating a security alert when communication with the RFID tag by the second RFID antenna is terminated.

In a further implementation form of the aspect, the server hosts a dataset defining sets of pieces of jewelry, and further comprising code for accessing data of another piece of jewelry related to the at least one piece of jewelry by a common set, and for presenting a recommendation of the another piece of jewelry on the at least one screen.

In a further implementation form of the aspect, the counter pad is implemented as foldable case with cover.

In a further implementation form of the aspect, dimensions of the counter pad are less than about 30 centimeters by 25 centimeters and/or the counter pad is sized and/or shaped for being held by hand.

In a further implementation form of the aspect, further comprising a camera set to capture an image of the at least one piece of jewelry disposed on the work surface, and code for analyzing the image relative to the data for identifying that the at least one piece of jewelry depicted in the image matches the data obtained according to the RFID tag.

In a further implementation form of the aspect, further comprising a plurality of contact sensors embedded within the work surface for generating a pattern of contact of the work surface by the at least one piece of jewelry, and code for analyzing the pattern relative to the data for identifying that the at least one piece of jewelry that generated the pattern matches the data obtained according to the RFID tag.

In a further implementation form of the aspect, further comprising at least one weight sensor associated with the work surface for measuring a weight of the at least one piece of jewelry disposed on the work surface, and code for analyzing the weight relative to the data for identifying that the weight of the at least one piece of jewelry placed on the work surface matches the data obtained according to the RFID tag.

In a further implementation form of the aspect, a kit comprises: the counter pad, and the at least one screen, wherein the at least one screen is physically detached from the counter pad.

In a further implementation form of the aspect, the at least one screen is installed within a housing, and further comprising a second data communication interface installed within the housing, the second data communication interface configured for communicating with the data communication interface of the counter pad, wherein the second communication interface is configured for wireless communication with the data communication interface of the counter pad.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
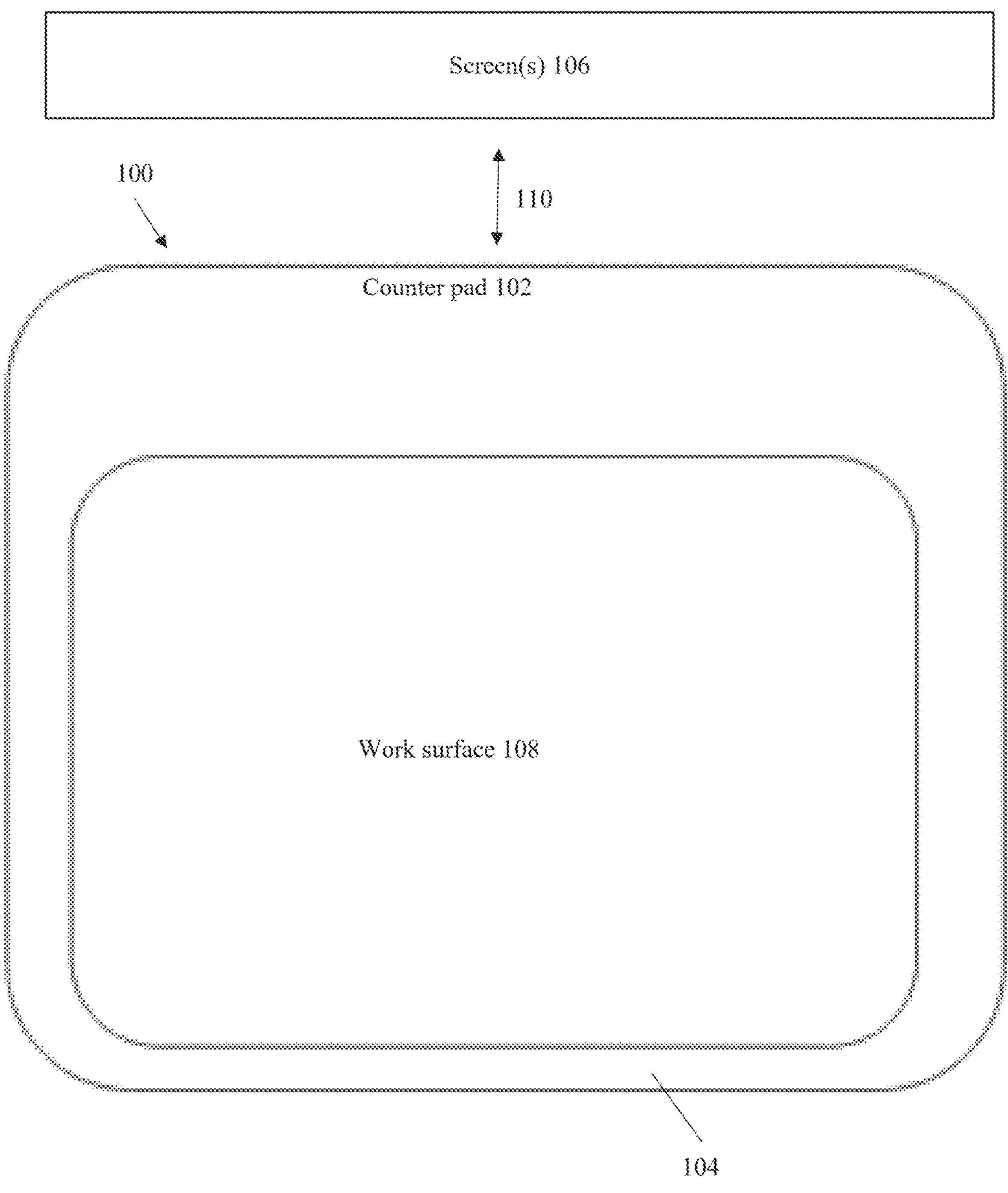
FIG. 1 is a schematic of a face-on view of a counter pad for presentation of data associated with jewelry, in accordance with some embodiments of the present invention.

The present invention, in some embodiments thereof, relates to a counter pad and, more specifically, but not exclusively, to a jewelry pad.

As used herein, the term "item" of jewelry is not necessarily limited to a single item of jewelry. The term "item" may refer to two or more items of jewelry that may be simultaneously placed on the counter pad, for example, for comparison.

Jewelry may refer to decorative items that are worn for personal adornment, for example, a necklace, bracelet, ring, earing, and the like. Jewelry may refer to functional items that are also worn for personal adornment, for example, wrist watch and cufflinks.

An aspect of some embodiments of the present invention relates to a counter pad designed for presentation of jewelry and automatic detection of the presence of jewelry for triggering automatic presentation of data associated with the jewelry. Data may include text, images, videos, and/or audio. The counter pad includes a non-abrasive and/or flexible surface, for example, a soft and/or velvety surface. The non-abrasive and/or flexible surface may be designed to protect the jewelry placed on the counter pad, for example, from scratches, hits, and the like. The counter pad includes a work surface designed for placement of a piece of jewelry, and optionally for simultaneously placement of two or more pieces of jewelry. The counter pad further includes a data communication interface for communicating with at least one screen. The screen(s) is physically detached from the counter pad, for example, the screen(s) is installed within its own housing which is physically separate from the counter pad. The data communication interface may be set for wireless communication with the screen(s). The data communication interface may be set for wireless communication with multiple screens, optionally simultaneously and/or at different time intervals. For example, all screens may display the same data sent by the data communication interface. In another example, different data may be presented by different screens according to data communication interface. The screen may be a standard screen, may include an interactive user interface (e.g., touch screen), and/or may include enhanced features such as a virtual reality (VR) headset and/or an artificial reality (AR) headset. The screen(s) may be associated with a different communication interface, which may be set for wireless communication. The communication interface associated with the screen(s) may be installed within the housing of the screen(s). The screen(s) presents data associated with an identifier of the piece(s) of jewelry received from the data communication interface of the counter pad. Examples of identifiers of the piece(s) of jewelry include, type of jewelry (e.g., earing, ring, necklace), cost, designer, how to put on/take off, gold carats, quality/properties of diamonds or other precious stones embedded therein, other matching jewelry items, images of models wearing the jewelry, video of a zoom-in on different parts of the jewelry, and an audio message describing on which occasions to best wear the jewelry.

An aspect of some embodiments of the present invention relates to a kit comprising the counter pad described herein in one or more embodiments, and the screen. The screen is physically detached from the counter pad. Data communication interfaces installed within the counter pad and the screen provide for wireless communication of data from the counter pad for presentation on the screen.

Installing the data communication interface within the counter pad, physically separating the screen from the counter pad, and optionally providing wireless communication ability, provides the counter pad with enhanced abilities, for example, presenting on any generic screen, simultaneously presenting on multiple different screens, presenting on remotely located screens, and/or presenting on specialized screens such as a virtual reality headset.

The counter pad may further include one or more radio-frequency identification (RFID) antennas. The RFID antennas may be positioned within the non-abrasive and/or flexible surface, optionally below the work surface. The RFID antenna(s) are designed to transmit and/or receive signals from an RFID tag(s) located on the piece(s) of jewelry when the piece(s) of jewelry is located on the work surface, optionally in contact with the work surface.

The counter pad may further include one or more RFID readers that process the signals received by the RFID antennas, to determine the identifier of the piece of jewelry.

The counter pad may further include a wireless network interface for communicating with a wireless network.

The counter pad may further include one or more processors executing a code for accessing a server over the wireless network for obtaining the data associated with the identifier. The processor(s) may instruct presentation of the data on the screen.

The counter pad may further include a memory for storing the code and the data associated with the identifier obtained from the server.

The counter pad may further include a battery, optionally rechargeable, for powering the components of the counter pad.

At least some embodiments described herein address the technical problem of obtaining and presenting data associated with a piece of jewelry. At least some embodiments described herein improve upon prior approaches of obtaining and presenting data associated with a piece of jewelry. Each unique piece of jewelry is associated with its own data. Since the jewelry is small, the data (apart from the price which is usually attached by a small tag) is usually provided on a separate secondary source, for example, a printed catalogue, web pages, or verbally by a salesperson working at the store. A user looking at different pieces of jewelry, and wishing to compare them according to their data has a reduce user experience by having to constantly refer to the secondary data source. The user may need to look up each piece of jewelry on the secondary data source, for example, searching the printed catalogue and/or performing an online search. The secondary data source may not be available is some situations, for example, a user looking at jewelry at a physical store may not have immediate access to the data, and may requiring access a website of the store using their mobile device to look up each piece of jewelry.

At least some embodiments described herein improve the technology of electronic mobile devices, and/or the technology of devices for enhanced user experience, by providing a counter pad for jewelry that automatically reads an RFID tag on the jewelry to access a server over a wireless network for automatically obtaining the data associated with the jewelry. The data is transmitted from the counter pad to an external screen via a data communication interface installed within the counter pad. In an example, the counter pad described herein may be used for facilitating sales of jewelry, by expanding the toolset available to the sales personnel. A sales representative or a customer may place the jewelry on the counter pad during a sales interaction for automatically obtaining data associated with the jewelry.

At least some embodiments described herein address the technical problem of securing jewelry. For example, a user may pretend to browse by picking up different pieces of jewelry to look at, in order to steal one of the items when a salesperson is not paying attention. At least some embodiments described herein improve over existing approaches for securing jewelry, for example, cameras monitoring the location where the jewelry is kept (e.g., store), and tags that set off an alarm when attempting to walk past a sensor. Such tags are not commonly used for individual pieces of jewelry since they are bulky. At least some embodiments described herein improve the technology of securing jewelry, by providing one or more approaches using the counter pad, as described herein in detail. In some embodiments, the presence of the jewelry on the counter pad may be validated. For example, by sensing data of the jewelry when placed on the contact pad (e.g., pattern of contact, weight, and an image), and analyzing the data such to make sure that the jewelry is present on the counter (e.g., jewelry is present in the image, weight is above zero). For example, to prevent a scenario where a thief stole the jewelry but left the RFID in place on the counter pad, in an attempt to make it seem as if the jewelry is still there since the RFID is still being read. In some embodiments, the jewelry itself is validated, for example, to ensure that the RFID is associated with the correct piece of jewelry, such as to avoid a situation where the wrong RFID is attached to the jewelry. For example, the sensed data is compared to data obtained from the server in response to the provided identifier. A match indicates the correct RFID. A mismatch indicates that the RFID does not belong to this piece of jewelry currently located on the counter pad.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
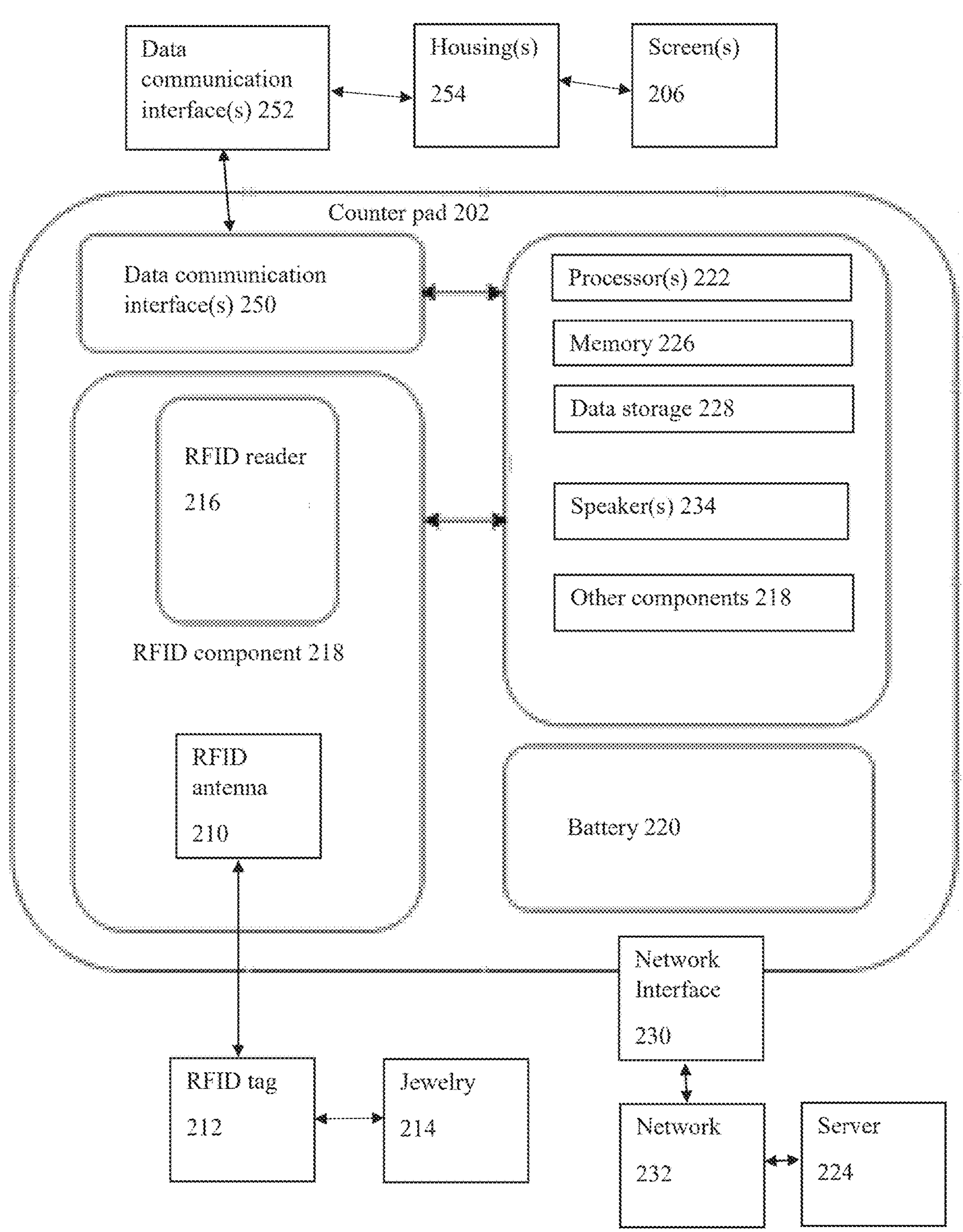
FIG. 2 is a block diagram of components of a system including a counter pad, in accordance with some embodiments of the present invention.
Figure 3:
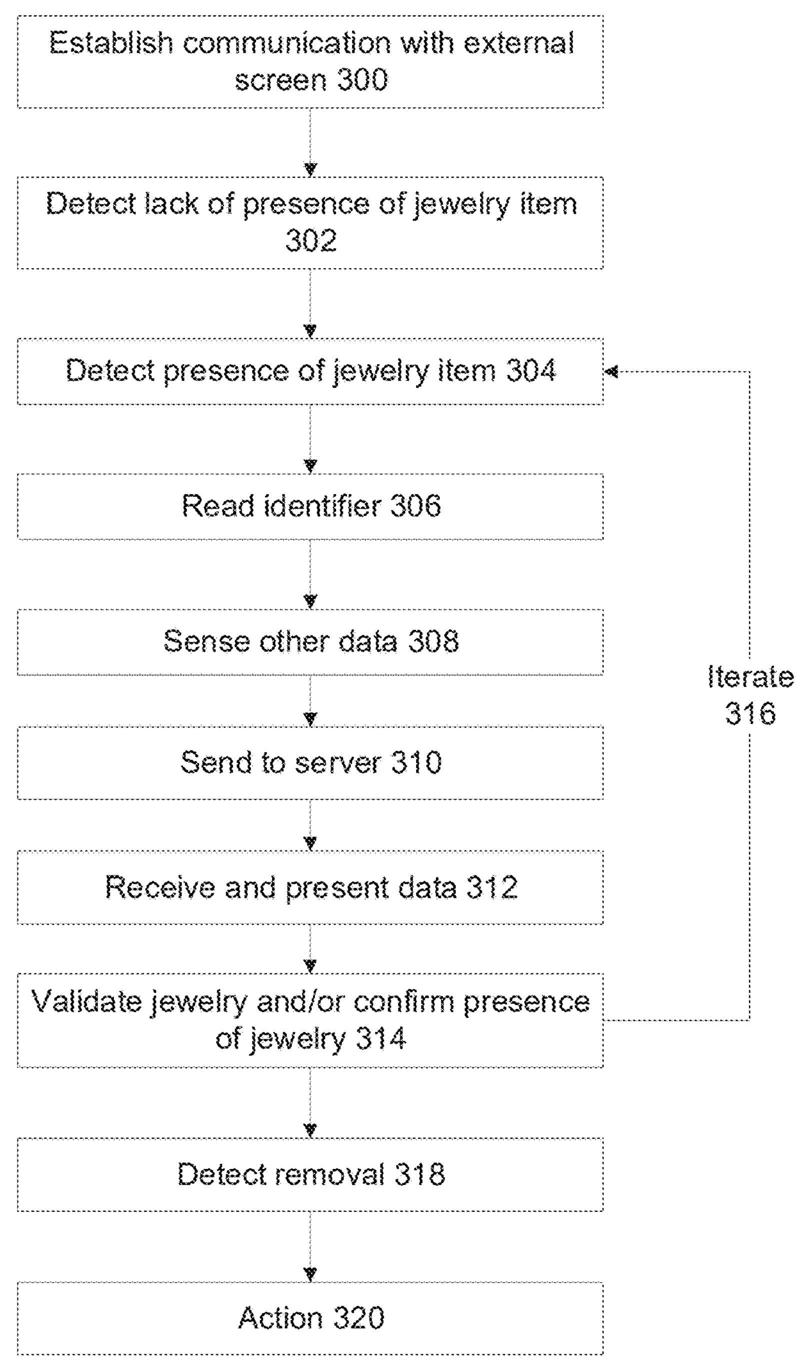
FIG. 3 is a flowchart of a method of operating a counter pad, in accordance with some embodiments of the present invention.

Reference is now made to FIG. 1, which is a schematic of a face-on view 100 of a counter pad 102 for presentation of data associated with jewelry, in accordance with some embodiments of the present invention. Reference is also made to FIG. 2, which is a block diagram of components of a system 200 including a counter pad 202, in accordance with some embodiments of the present invention. Reference is also made to FIG. 3, which is a flowchart of a method of operating a counter pad, in accordance with some embodiments of the present invention.

Referring now back to FIG. 1, counter pad 102 may be sized and/or shaped for being held by hand. For example, having dimensions of about 10×20 centimeters (cm), or about 15×15 cm, or about 25×30 cm, or about 20×25 cm, or about 10-30×10-30 cm, or other dimensions. Alternatively, counter pad 102 is sized and/or shaped and/or designed for being placed on a counter, and not necessarily held by hand or making it difficult to be held by hand, such as to avoid theft of counter pad 102. For example, counter pad 102 weights more than about 500 grams, or 1 kilogram (kg), or 2 kg, and the like, making it uncomfortable to hold. In another example, counter pad 102 is sized to accommodate multiple spaced apart jewelry pieces for simultaneous viewing and/or comparison, for example, over about 20×30 cm, or over 20×40 cm, or over 30×30 cm, and the like.

Counter pad 102 includes a non-abrasive and/or flexible surface 104. The non-abrasive component of surface 104 is designed to protect jewelry placed thereon from damage, for example, from scratches, that may occur from multiple users placing the piece of jewelry down on a surface. The flexible component of surface 104 is designed to protect jewelry placed thereon from damage, for example, dents, and repetitive knocks. The flexible surface may conform in response to placement of the piece of jewelry thereon, for absorbing pressure forces applied by the jewelry, such as when the jewelry is dropped onto surface 104.

Surface 104 may be soft, for example, yielding in response to an applied force exerted by the jewelry placed or dropped on surface 104.

Surface 104 may be made from, and/or coated with, a non-abrasive and/or flexible material, for example, velvet, suede, leather, leatherette, plush fabric, and felt.

Counter pad 102 may be implemented as a substantially flat design (including variations in height along its surface).

Alternatively, counter pad 102 is implemented as foldable case with cover. The cover may serve to protect the non-abrasive and/or flexible surface 104.

Counter pad 102 is in communication 110 with one or more screens 106 located externally to counter pad 102. Communication 110 between counter pad 102 and screen 106 may be implemented as a wireless communication and/or a temporary wired communication via cable that is reversibly plugged into (and removable from) screen 106 and counter pad 102. Screen 106 is designed for presenting data associated with an identifier of the piece(s) of jewelry. For example, screen 106 may be color, and/or high resolution. Screen 106 may be a touch-screen for enabling interaction by the user. Screen 106 may include and/or be designed for enhanced features, for example, installed within a VR headset and/or AR headset.

Non-abrasive and/or flexible surface 104 may include a work surface 108 designed for placement of the piece(s) of jewelry. Work surface 108 may be flat. Work surface 108 may be smooth. Work surface 108 may be made of the same material as non-abrasive and/or flexible surface 104. Work surface 108 may be slightly more rigid than surface 104, such as to not significantly deform when the jewelry is placed thereon to enable viewing of the sides of the jewelry and/or to pick it up. Work surface 108 may be flexible for protecting the jewelry placed on it.

Regions of non-abrasive and/or flexible surface 104 surrounding work surface 108 may be padded, and/or may be higher, than a plane of work surface 108. The padding and/or increased height may protect the piece(s) of jewelry located on work surface 108, and/or may provide a barrier for preventing the piece(s) of jewelry from sliding off the counter pad, for example, when a user tilts counter pad 102.

Referring now back to FIG. 2, counter pad 202 may be implemented as described with reference to counter pad 102 of FIG. 1. Components of counter pad 202 may be referred to with respect to components of counter pad 102, for example, to help understand where components of counter pad 202 are physically located within counter pad 102.

Counter pad 202 is in communication with one or more screens 206 implemented as described with reference to screen 106 of FIG. 1.

Counter pad 202 includes one or more data communication interfaces 250 for communicating with screen(s) 206, optionally with one or more data communication interfaces 252 associated with screen(s) 206.

Data communication interface(s) 250 and/or data communication interface(s) 252 may be set for wireless communication by implementing one or more wireless communication protocols, for example, Wi-Fi, Bluetooth, wireless HDMI, and/or other RF based technologies. Data communication interface(s) 250 and/or 252 may include one or more transceivers (e.g., antennas) for enabling the wireless communication. Alternatively or additionally, data communication interface(s) 250 and/or data communication interface(s) 252 may be set for implementing a detachable wired interface (e.g., USB-C, HDMI, or Thunderbolt) to establish temporary connectivity without requiring physical integration, i.e., the cable may be connected and detached.

Screen 206 is physically detached from counter pad 202. Screen 206 may be installed within a housing 254. Screen 206 within housing 254 may be referred to herein as a display. The term screens and display may sometimes be interchanged. Data communication interface 252 may be installed within housing 254.

Screen 206 may be implemented as and/or within, for example, a dedicated screen designed for compatibility with counter pad 202, a generic external monitor (e.g., a liquid crystal display (LCD)), a television, a projector, a touch screen, and/or within a device designed for enhanced features such as within a VR headset and/or AR headset and/or other head mounted display (HMD), a tablet, a smartphone, a smart display, a wearable display (e.g., smart glasses, wrist worn screens capable of receiving visual output from a computer), digital signage panels (e.g., large format displays) and the like.

Counter pad 202 includes one or more RFID antennas 210, designed for transmitting to and/or receiving signals from one or more RDIF tags 212 located on one or more pieces of jewelry 214.

RFID antenna(s) 210 may be positioned below non-abrasive and flexible surface 104 (as described with reference to FIG. 1), optionally below work surface 108, corresponding to a location below where jewelry 214 is expected to be placed. Placement of RFID antenna(s) 210 below where the jewelry 214 is expected to be placed may enable using short range and/or low energy antennas, which may save power and/or increase accuracy of reading RFID tag 212 rather than erroneously reading RFID tags of other jewelry which are nearby but not of interest. RFID antenna(s) 210 may be placed below regions of surface 104 that surround work surface 108, for example, within padding that is elevated above a plane of work surface 108. RFID antenna(s) 210 may be oriented towards sensing over work surface 108.

RFID antenna(s) 210 may be in electrical communication with an RFID reader(s) 216 that receives signals by RFID antenna(s) 210, and analyzes the signals for determining an identifier (e.g., unique identifier) of the piece of jewelry 214.

Optionally, when RFID tag 212 is implemented as a passive RFID tag, RFID antenna(s) 210 and/or RFID reader (s) 216 may be arranged for wirelessly powering RFID tag 212 when located in proximity to work surface 108 and/or over work surface 108 and/or in contact with work surface 108.

RFID antenna 210 may be implemented for short range transmission and/or reception of signals. The short range may be set for wirelessly communicating with RFID tag 212 located on work surface 108 or in near proximity to work surface 108, for example, less than about 1 cm, or 3 cm, or 5 cm, or 10 cm, or other values. Optionally, in the short range implementation the RFID antenna 210 is unable to communicate (e.g., transmit and/or receive signals) when the piece of jewelry with the RFID tag 212 disposed thereon is not located on work surface 108 and/or not in proximity to work surface 108.

RFID antenna(s) 210 and RF reader(s) 216 may be arranged as an RF component 218, for example, a common hardware platform.

Optionally, counter pad 202 includes one or more other components 218.

The other component(s) 218 may include one or more contact sensors. The contact sensor(s) may sense when the piece of jewelry 214 with RFID tag 212 is in contact with the work surface 108 and/or when the piece of jewelry 214 with RFID tag 212 is not in contact with the work surface 108. The contact sensor(s) may be located below work surface 108. Examples of contact sensor include a force sensor designed to sense presence of jewelry 214 by sensing an increase in force on work surface 108, touch sensor designed to sense the presence of jewelry 214 via contact on work surface 108, tactile sensor designed to sense pressure by the jewelry 214 on work surface 108. The RFID antenna 210 may be activated in response to the contact sensor sensing that jewelry 214 is located on and/or in contact with work surface 108. The RFID antenna 210 may be deactivated in response to the contact sensor sensing that jewelry 214 is not located on (e.g., has been removed, has not yet been placed on) work surface 108. Using the contact sensor to activate and deactivate the RFID antenna 210 according to whether or not jewelry 214 with RFID tag 212 is located on work surface 108 may improve energy utilization of a battery 220 of counter pad 202.

Processor 222 may extract features from the contact sensor(s) applied by jewelry 214 on work surface 108, for example, shape of jewelry (e.g., when there are multiple contact sensors or a large contact sensor sensing multiple locations on work surface 108) and/or distribution of applied forces. Processor 222 may compare the features to the data obtained from a server 224 using the identifier of RFID tag 212. The comparison may validate the jewelry 214, for example, for catching a scenario where an RFID tag of one piece of jewelry was accidently or maliciously placed on a different piece of jewelry.

Alternatively or additionally, the other component(s) 218 may include a second RFID antenna (in communication with RF reader 216) designed for sensing of the RFID tag 212 on jewelry 214 at a range greater than proximity to work surface 108. For example, the range may be at least as far as from counter pad 202 to a location where the piece of jewelry 214 is usually stored, and/or to an entrance of a store selling jewelry 214, for example, about 1-5 meters, or at least 50 centimeters, or about 2-4 meters, and the like. RFID reader 216 may continuously (or at short time intervals shorter than a time needed for stealing the jewelry, such as every 1 or 2 seconds) track RFID tag 212. A security alert may be generated (e.g., by a processor 222 in communication with RF reader 216) when communication with RFID tag 212 by the second RFID antenna is terminated, indicating that the jewelry 214 is out of bounds and likely stolen.

Alternatively or additionally, the other component(s) 218 may include a camera set to capture one or more images of the piece of jewelry 214 with RFID tag 212 located on the work surface 108. For example, camera may be embedded within an elevation of surface 104 surrounding work surface 108, oriented to cover work surface 108. The camera may include a lens wide enough to capture the entire work surface 108. The camera may be in communication with processor 222. Processor 222 may execute code for analyzing the image, for example, for automatically identifying the piece of jewelry 214. Processor 222 may extract features from the jewelry 214 depicted in the image, and compare the features to the data obtained from a server 224 using the identifier of RFID tag 212. Examples of features include: color, size, dimensions, presence of previous jewels, classification category (e.g., earring, ring, necklace), shape, components (e.g., handing jewels, single continuous piece or multiple pieces connected together), and the like. The comparison may validate the jewelry 214, for example, for catching a scenario where an RFID tag of one piece of jewelry was accidently or maliciously placed on a different piece of jewelry. Processor 222 may analyze image to detect jewelry, for example, using image processing approaches and/or using a trained ML model (e.g., trained on images of different jewelry items each labelled with a ground truth of the indication represented by the RFID tag). In another example, RFID antenna 210 may be activated in response to processor 222 detecting jewelry 214 depicted in the image captured by camera, and RFID antenna 210 may be deactivated in response to processor 222 not detecting jewelry 214 depicted in the image captured by camera (e.g., jewelry has been removed or not yet placed). Using the camera to activate and deactivate the RFID antenna 210 according to whether or not jewelry 214 with RFID tag 212 is located on work surface 108 may improve energy utilization of a battery 220 of counter pad 202.

Alternatively or additionally, the other component(s) 218 may include a weight sensor associated with the work surface for measuring a weight of the piece of jewelry disposed on the work surface. The RFID antenna 210 may be activated in response to the weight sensor sensing a non-zero weight and/or weight within a range of jewelry, indicating that jewelry 214 is located on and/or in contact with work surface 108. The RFID antenna 210 may be deactivated in response to the contact sensor sensing zero weight or weight below the range of jewelry, indicating that jewelry 214 is not located on (e.g., has been removed, has not yet been placed on) work surface 108. Using the weight sensor to activate and deactivate the RFID antenna 210 according to whether or not jewelry 214 with RFID tag 212 is located on work surface 108 may improve energy utilization of a battery 220 of counter pad 202.

Processor 222 may compare the weight to the data obtained from a server 224 using the identifier of RFID tag 212. The comparison may validate the jewelry 214, for example, for catching a scenario where an RFID tag of one piece of jewelry was accidently or maliciously placed on a different piece of jewelry.

Counter pad 202 includes one or more processors 222. Processor(s) 222 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 222 may include a single processor, or multiple processors (homogenous or heterogeneous) arranged for parallel processing, as clusters and/or as one or more multi core processing devices.

Processor(s) 222 may be in communication with one or more components of counter pad 202 described herein.

Processor(s) 202 accesses server 2245 over a network 228 for obtaining the data associated with the identifier of RFID tag 212. Processor(s) 202 instructs data communication interface(s) 250 for sending data for display on screen 206.

Counter pad 202 may include a memory 226 for storing code instructions executable by processor(s) 222. Alternatively or additionally, processor 202 is designed to include a hardware representation of the code instructions otherwise stored on a memory. Memory 226 may store the data accessed from server 224 of current and/or previous RFID tags 212, for fast loading of the same or similar RFID tags in the future. Memory 226 may be implemented as, for example, a random access memory (RAM), read-only memory (ROM), and/or a storage device.

Counter pad 202 may include a data storage device 228, for example, non-volatile memory, semiconductor memory devices, hard drive, removable storage, and the like. Data storage device 228 may be in addition to memory 226. Alternatively, memory 226 may store data instead of data storage device 228 when no data storage device 228 is implemented.

Counter pad 202 includes a network interface 230 for communicating with network 228, for accessing server 224. Network interface 230 may be implemented as, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 232 may be implemented as, for example, the internet, a local area network, a virtual network, a wireless network, a cellular network, a local bus, a point to point link (e.g., wired), and/or combinations of the aforementioned.

Counter pad 202 includes a mechanism designed for insertion of one or more batteries 220 for powering the counter pad. The batteries 220 may be disposable and/or rechargeable. Counter pad 202 may include the batteries 220 embedded therein, for example, rechargeable batteries that do not require replacement.

Counter pad 202 may include speakers 234 for playing audio associated with the data of the RFID tag, and/or a microphone for enabling voice activated control of screen 206 via instructions sent via data communication interface(s) 250, for example, to scroll up/down, zoom in/out, or make a selection. Alternatively or additionally, speakers 234 are installed with respect to screen 206, physically externally from counter pad 202. For example, speakers 234 may be installed within housing 254.

Referring now back to FIG. 3, features described with reference to FIG. 3 may be implemented by components of counter pad 102 described with reference to FIG. 1 and/or counter pad 202 described with reference to FIG. 2. Optionally, processor executing code instructions stored on memory, based on input from one or more components and/or generating instructions for operating one or more components, implements the features described with reference to FIG. 3.

At 300, the counter pad may establish communication with one or more screens located externally to the counter pad.

The communication also referred to herein as a communication session, may be established between the data communication interface of the counter pad and the data communication interface of the screen. The communication session may be over a wireless communication session and/or over a physical communication session established over a cable plugged into the data communication interface of the counter pad and the data communication interface of the screen. The cable is designed to be temporary, by being designed to be detached from the interfaces.

The communication session may be established, for example, by initiating a connection request from the counter pad to the external screen via the data communication interface, such as HDMI, DisplayPort, USB-C, or a wireless protocol (e.g., Miracast or Wi-Fi Direct). Upon detection of a compatible display device, the counter pad may transmit a session initiation signal that includes display configuration parameters such as resolution, refresh rate, and color depth. The external screen may respond with an acknowledgment signal confirming compatibility and readiness to receive visual output. The counter pad may then establish the communication session by configuring its graphical output pipeline in accordance with the negotiated parameters and begins transmitting video and/or graphical data to the external screen. Optionally, the communication session may support bi-directional data exchange to enable features such as touch input or peripheral control, depending on the capabilities of the connected screen and underlying protocols.

Optionally, the counter pad establishes communication with multiple different external screens and/or display devices. The counter pad may instruct all screen to present the same data, or may send different data to different screens.

The counter pad may establish communication with screens of different types. The data sent by counter pad to the screen may be processed and/or formatted according to the type of the screen. For example, the resolution may be selected according to the size of the screen, such as high resolution for large screens and a lower resolution for smaller screens. In another example, interactive features may be enabled when the screen is associated with a user interface (e.g., touch screen), such as ability to rotate images of the jewelry and/or click on links, and the like. In yet another example, VR and/or AR features may be enabled with the screen is associated with a VR headset and/or AR headset and/or other head mounted display (HMD).

At 302, the state of no jewelry being present on (e.g., placed and/or in contact with) the work surface is detected. Optionally, an analysis of sensor data, such as images, weight, and/or contact sensor as described herein, indicates that no jewelry is present on the work surface.

Optionally, RFID antenna 210 is in an off and/or non-active state while no jewelry is present on the work surface. In response to sensing that the piece of jewelry is not in contact with the work surface and/or in response to not sensing that the piece of jewelry is in contact with the work surface, the RFID antenna is blocked from sensing the RFID tag and/or the RFID antenna is non-powered and/or signals received by the RFID antenna are ignored.

At 304, the presence (e.g., contact) of jewelry on the work surface is detected.

Optionally, an analysis of sensor data, such as images, weight, and/or contact sensor as described herein, indicates that jewelry is present on the work surface. In response to sensing that the piece of jewelry is in contact with the work surface, the RFID antenna is triggered (e.g., activated, turned on) for sensing the signals from RFID and the RFID reader is triggered to analyze the signals to obtain the identifier.

At 306, signals of the RFID tag are sensed by the RFID antenna. The RFID reader generates the identifier (e.g., unique identifier) for the jewelry. It is noted that different RFID tags of different physical pieces of jewelry of the same model may have the same identifier. For example, the same earrings having barcode ABCD1234 may have the same identifier, even though they are physically different objects. The identifier may be, for example, the barcode of the jewelry that is scanned to generate the price of the jewelry, or another implementation.

At 308, one or more other data are sensed by one or more other sensors. The additional data may be used, for example, to validate that the jewelry, and/or for securing of the jewelry.

The other sensors may be activated by the RFID reader reading the RFID tag, and/or the other sensors may be continuously operational.

Optionally, a pattern of contact by the work surface and the piece of jewelry may be obtained by one or more contact sensors embedded within the work surface.

Alternatively or additionally, an image of the work surface is captured by a camera. at least one piece of jewelry disposed on the work surface Alternatively or additionally, a weight of the at least one piece of jewelry disposed on the work surface is sensed by one or more weight sensors associated with the work surface.

At 310, the identifier and/or other data sensors by other sensors is sent to the server. The data may be sent over a wireless network.

At 312, data is received from the server in response to the identifier.

The data may include data for presentation on the screen in communication with the counter pad, and/or for playing on speakers of the counter pad. For example, images, video, sound tracks, and spoken speech. The data may include, for example, price of the jewelry, type of jewelry (e.g., earring, ring, necklace), color, karats of gold, diamonds and their descriptions, other jewels, weight, structure, and the like.

Reception of the data from the server may automatically trigger the processor to present the data associated with the identifier on the screen and/or play audio on the speakers.

The data received from the server may be for validation of the jewelry, as described with reference to 314.

The data received from the server may be a recommendation for one or more additional pieces of jewelry, which may be related to the jewelry associated with the identifier. The recommendation may be based on likelihood of a user purchasing the recommended jewelry.

Optionally, the server hosts a dataset defining sets of pieces of jewelry, for example, a necklace, earing, and/or ring. Multiple overlapping sets may be defined, for example, the same necklace may be matched with different types of earrings. The data received from the server may indicate another piece of jewelry related to the jewelry associated with the identified according to a common set defined by the dataset. A recommendation of the other piece of jewelry may be presented on the screen.

Alternatively or additionally, the recommendation may be obtained in response to sending one or more parameters associated with the piece of jewelry associated with the identifier to the server. The parameters may be sent with the identifier (e.g., in a common message and/or over the same communication channel), and/or before and/or after the identifier, as described with reference to 310. The parameters may be extracted from data sensed by sensors, for example, as described with reference to 308. Alternatively or additionally, one or more of the parameters may be stored on a data storage device accessible by the server, for example, a manufacturer's catalogue. Examples of parameters include: identifying of the jewelry, color, price, material, where jewelry is worn on body, part of a set or not, how long jewelry was placed on work surface, how many times jewelry was removed from work surface and placed back on the work surface, whether jewelry was placed on the work surface with another jewelry, and sequence of items of jewelry placed on the work surface.

The recommendation may be generated as an outcome of a machine learning (ML) model that is fed the parameters. The server may create a record from the sent parameter(s) and data indicating whether the recommended piece of jewelry was purchased, put back, and/or whether another piece of jewelry was selected, optionally as ground truth. The record may be created without being based on a prior recommendation, for example, using the parameters and an indication of whether the jewelry associated with the parameters was purchased, put back, or replaced with another piece of jewelry. Multiple records may be created from parameters obtained for different pieces of jewelry from different counter pads at different geographical locations. The ML model may be trained on a training dataset of the multiple records. The ML model may be dynamically updated using newly generated records, optionally generated in response to recommendations generated by the ML model. The ML model may be trained for generating a recommendation of another piece of jewelry for placement on the work surface for increasing likelihood of purchase. Examples of ML models include: a classifier, a neural network, support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

At 314, the physical presence of the jewelry on the work surface may be confirmed by analyzing the data obtained by the sensor(s) (e.g., as described with reference to 308). Alternatively or additionally, the jewelry may be validated by comparing the data sensed from one or more other sensors (e.g., as described with reference to 308), to data obtained from the server in response to the identifier. The validation may be performed to check that the correct RFID is associated with the physical piece of jewelry currently on the work surface.

The presence of the jewelry may be confirmed by analyzing the pattern of contact between the work surface and the jewelry, a pattern of contact representing a shape of one of the available pieces of jewelry indicates that the jewelry is present. The pattern of contact of the RFID tag may be known, and ignored to avoid only detecting the RFID tag without the jewelry itself. For example, a pattern of contact in the shape of a circle indicates that an earring or ring is present.

The jewelry may be validated by comparing the pattern of contact sensed by the contact sensor to the pattern of contact obtained from the server in response to providing the identifier extracted from the RFID tag. The comparison may account for possible geometrical variations. For example, a necklace may form different patterns of contacts such as different curves depending on how it is put down.

The presence of the jewelry may be confirmed by analyzing the image to detect jewelry depicted therein. For example, using image processing approaches, and/or by feeding the image into a trained classifier that outputs a classification category indicating whether jewelry is present in the image or not.

The jewelry may be validated by extracting features from the image, and comparing the extracted features to features obtained from the server in response to providing the identifier extracted from the RFID tag. Examples of features include: color, size, dimensions, presence of previous jewels, classification category (e.g., earring, ring, necklace), shape, components (e.g., handing jewels, single continuous piece or multiple pieces connected together), and the like.

The presence of the jewelry may be confirmed by analyzing the weight, for example, that the weight is above a threshold indicating presence of jewelry, such as greater than the weight of the RFID tag.

The jewelry may be validated by checking that the weight of the jewelry sensed by the weight sensor matches the expected weight of the jewelry obtained from the server in response to providing the identifier extracted from the RFID tag.

At 316, one or more features described with reference to 304-314 may be iterated.

The iterations may be performed in response to placement of one or more additional pieces of jewelry on the work surface of the counter pad. Iterations may be performed sequentially, as multiple pieces of jewelry are sequentially placed on the counter pad. Iterations may be performed substantially simultaneously when multiple pieces of jewelry are substantially simultaneously placed on the counter pad. For example, the RFID reader determines the identifier of each of the multiple pieces of jewelry, and the processor executes the code for accessing the identifier of each of the multiple pieces of jewelry for presentation on a screen. The data of the multiple pieces of jewelry may be presented, for example, simultaneously on the screen such as side by side, used to generate a comparison chart between similar pieces of jewelry for presentation on the screen, and/or used to create a dynamic interactive interface in which the user can select which piece of jewelry they would like to view. For example, three different types of necklaces may be simultaneously placed side by side on the work surface of the counter pad. The screen may be instructed to present a comparison table, indicating the name of each necklace, the cost, the designer of each item, the weight, the material the necklace is made from, description of pendant (if any, such as arrangement of diamonds and/or precious stones), and recommendation of when to wear (e.g., every day, weddings, business meetings, and the like).

In another implementation, when the multiple pieces of jewelry are part of a defined set, the screen may present information common for the set, and optionally details of each piece of jewelry of the set. For example, a necklace and earrings of a matching set may be simultaneously placed side by side on the work surface of the counter pad. The screen may be instructed to present a description of the set, such as total cost, materials, designer, and recommendation of when to wear the items. The user may select one item of the set to obtain additional details for the specific item, for example, by clicking an icon representing the item on the screen. For example, the user wishes to learn more about the necklace by clicking a picture of the necklace and/or the word "necklace" on the screen.

Optionally, identifiers of multiple pieces of jewelry placed on the work surface are analyzed to identify the pieces of jewelry most commonly placed on the work surface. Data obtained from the server for identifiers of the pieces of jewelry most commonly placed on the work surface may be stored on the memory of the counter pad for fast loading when another piece of jewelry is placed on the work surface, rather than accessing the server. Alternatively, the data of each identifier of jewelry previously placed on the work service is stored in the memory for fast loading.

Optionally, a dynamic update to the data received from the server, for the piece of jewelry placed on the work surface, is received. The presentation of the data on the screen may be dynamically updated according to the dynamic update. For example, a new video is presented, a real-time sale is occurring, or new details regarding the type of gold used is provided.

At 318, removal of the jewelry from the counter pad may be automatically detected.

Removal of the jewelry may be detected by analysis of signals from sensors, for example, by the RFID reader that detects termination of the signal from the RFID tag, data of the contact sensor indicating lack of contact sensor, data of the weight sensor indicating zero weight or weight below the threshold, and/or analysis of the image indicating lack of the jewelry.

At 320, one or more actions may be taken in response to detection of removal of the jewelry.

Optionally, the screen is cleared from the presented data associated with the identifier of the removed jewelry.

Optionally, another (or same) RFID antenna of the counter pad, which may be designed for passive reading of the RFID at a range greater than in proximity to the counter pad (e.g., greater than about 20 cm, or 50 cm, or 1 meter, or 3 meters, or other values) may track (e.g., continuously or at short intervals) the RFID tag on the piece of jewelry. The processor may generate a security alert when communication with the RFID tag via the other RFID antenna is terminated. Termination of communication may indicate that the RFID tag is too far from the RFID antenna, which may be caused by the jewelry being moved out of the store or far away from the point of sale, such as being stolen.

The methods as described above may be used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant RFID components will be developed and the scope of the term RFID is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A counter pad for presentation of data associated with at least one piece of jewelry, comprising:
- a non-abrasive and flexible surface including:
  - a work surface designed for placement of the at least one piece of jewelry, and
- at least one RFID antenna positioned within the non-abrasive and flexible surface and below the work surface, the at least one RFID antenna configured to transmit and/or receive signals from at least one RFID tag located on the at least one piece of jewelry when the at least one piece of jewelry is located on the work surface;
- a data communication interface configured for communicating with at least one screen for presenting the data associated with an identifier of the at least one piece of jewelry;
- at least one RFID reader configured to process the signals to determine the identifier of the at least one piece of jewelry;
- at least one wireless network interface configured to communicate with a wireless network;
- at least one processor executing a code for accessing a server over the wireless network for obtaining the data associated with the identifier;
- a memory for storing the code and the data associated with the identifier obtained from the server; and
- a battery configured for powering the counter pad.

2. The counter pad of claim 1, wherein the at least one screen is physically detached from the counter pad.

3. The counter pad of claim 1, wherein the data communication interface is configured for wireless communication with the at least one screen.

4. The counter pad of claim 1, wherein the data communication interface is configured for wireless communication with a plurality of screens of different types.

5. The counter pad of claim 1, wherein the non-abrasive and flexible surface is selected from: velvet, suede, leather, leatherette, plush fabric, and felt.

6. The counter pad of claim 1, wherein regions of the non-abrasive and flexible surface surrounding the work surface are padded and are higher than the work surface for protecting the at least one piece of jewelry located on the work surface, and for providing a barrier for preventing the at least one piece of jewelry from sliding off the counter pad.

7. The counter pad of claim 1, wherein the at least one RFID antenna and/or the at least one RFID reader are configured for wirelessly powering the at least one RFID tag located on the at least one piece of jewelry implemented as a passive RFID tag.

8. The counter pad of claim 7, wherein the at least one RFID antenna is implemented as short range to transmit and/or receive signals when the at least one piece of jewelry with the at least one RFID tag disposed thereon is located on the work surface and wherein the at least one RFID antenna is unable to transmit and/or receive signals when the at least one piece of jewelry with the at least one RFID tag disposed thereon is not located on the work surface.

9. The counter pad of claim 1, wherein the at least one RFID antenna is configured to transmit and/or receive signals in response to the at least one piece of jewelry with the at least one RFID tag disposed thereon is in contact with the work surface.

10. The counter pad of claim 9, further comprising at least one contact sensor associated with the work surface and configured for sensing when the at least one piece of jewelry is in contact with the work surface,
- wherein in response to sensing that the at least one piece of jewelry is in contact with the work surface by the contact sensor, triggering the at least one RFID antenna for sensing the signal from the at least one RFID tag and triggering the at least one RFID reader to analyze the signals to obtain the identifier, and triggering the at least one processor to automatically present the data associated with the identifier on the at least one screen.

11. The counter pad of claim 8, wherein in response to sensing that the at least one piece of jewelry is not in contact with the work surface and/or in response to not sensing that the at least one piece of jewelry is in contact, the at least one RFID antenna is blocked from sensing the RFID tag and/or the at least one RFID antenna is non-powered and/or signals received by the at least one RFID antenna are ignored.

12. The counter pad of claim 1, further comprising a second RFID antenna configured for sensing the RFID tag on the at least one piece of jewelry at a range at least as far as from the counter pad to a location where the at least one piece of jewelry is stored, wherein the RFID reader is configured for continuously tracking the RFID tag and the processor is configured for generating a security alert when communication with the RFID tag by the second RFID antenna is terminated.

13. The counter pad of claim 1, wherein the server hosts a dataset defining sets of pieces of jewelry, and further comprising code for accessing data of another piece of jewelry related to the at least one piece of jewelry by a common set, and for presenting a recommendation of the another piece of jewelry on the at least one screen.

14. The counter pad of claim 1, wherein the counter pad is implemented as foldable case with cover.

15. The counter pad of claim 1, wherein dimensions of the counter pad are less than about 30 centimeters by 25 centimeters and/or the counter pad is sized and/or shaped for being held by hand.

16. The counter pad of claim 1, further comprising a camera set to capture an image of the at least one piece of jewelry disposed on the work surface, and code for analyzing the image relative to the data for identifying that the at least one piece of jewelry depicted in the image matches the data obtained according to the RFID tag.

17. The counter pad of claim 1, further comprising a plurality of contact sensors embedded within the work surface for generating a pattern of contact of the work surface by the at least one piece of jewelry, and code for analyzing the pattern relative to the data for identifying that the at least one piece of jewelry that generated the pattern matches the data obtained according to the RFID tag.

18. The counter pad of claim 1, further comprising at least one weight sensor associated with the work surface for measuring a weight of the at least one piece of jewelry disposed on the work surface, and code for analyzing the weight relative to the data for identifying that the weight of the at least one piece of jewelry placed on the work surface matches the data obtained according to the RFID tag.

19. A kit comprising:

the counter pad of claim 1, the at least one screen, wherein the at least one screen is physically detached from the counter pad.

20. The kit of claim 19, wherein the at least one screen is installed within a housing, and further comprising a second data communication interface installed within the housing, the second data communication interface configured for communicating with the data communication interface of the counter pad, wherein the second communication interface is configured for wireless communication with the data communication interface of the counter pad.

* * * * *